United States Patent

Rousseau et al.

Patent Number: 5,329,550
Date of Patent: Jul. 12, 1994

[54] SIGNAL PROCESSING CIRCUIT FOR THE EUROPEAN DIGITAL CELLULAR RADIO SYSTEM

[75] Inventors: Emmanuel Rousseau, Paris; Luc Dartois, Carrieres sous Poissy, both of France

[73] Assignee: Alcatel Radiotelephone, Paris, France

[21] Appl. No.: 791,401

[22] Filed: Nov. 14, 1991

[30] Foreign Application Priority Data

Nov. 15, 1990 [FR] France ............................. 90 14211

[51] Int. Cl.$^5$ ........................ H04B 1/38; H04L 5/16
[52] U.S. Cl. ........................................ 375/7; 379/59; 364/130; 364/178
[58] Field of Search ................ 375/7; 379/59; 381/26; 364/130, 131, 132, 135, 138, 178; 455/33.1

[56] References Cited

U.S. PATENT DOCUMENTS

| | | | |
|---|---|---|---|
| 5,008,900 | 4/1991 | Critchlow et al. | 375/11 |
| 5,008,953 | 4/1991 | Dahlin et al. | 455/33.1 |
| 5,133,001 | 7/1992 | Böhm | 379/59 |

OTHER PUBLICATIONS

Electrical Communication, vol. 63, No. 4, 1989, pp. 409-414, Romford, GB; M. Rahier et al.: "Advanced VLSI components for digital cellular mobile radio".
IEEE International Symposium on Circuits and Systems, vol. 2, Jun. 7-9, 1988, pp. 1803-1810, Espoo, FI; E. Kuisma et al.: "Signal processing requirements in Pan-european digital mobile communications".
Electronic Engineering, vol. 62, No. 763, Jul. 1990, pp. 16-17, Woolwich, Londres, GB; "ASIC family provides mobile radio functions".
Funkschau, vol. 62, No. 12, Jun. 1990, pp. 64-68, Munich, Germany; F. Leyrer: "Mobile Kommunikation Mega-Chips furs Taschentelefon".

Primary Examiner—Stephen Chin
Assistant Examiner—Don N. Vo
Attorney, Agent, or Firm—Sughrue, Mion, Zinn, Macpeak & Seas

[57] ABSTRACT

A signal processing circuit for the European digital cellular radio system continuously exchanging speech samples with a converter circuit (AD), exchanging baseband digital signals with a radio circuit (R) and exchanging data and signalling information with a control circuit (C) which also transmit control signals to it. The circuit comprises a control operator (CO), a processor (P) which controls an audio operator (AO) and a radio operator (RO), the audio operator (AO) receiving and producing the speech samples and transmitting them to the processor and receiving them from the processor in the form of groups of samples, the radio operator (RO) receiving and producing the baseband digital signals and transmitting them to the processor and receiving them from the processor in the form of batches, the control operator (CO) routing and formatting the data, the signalling information and the processor control signals, the processor (P) being adapted to apply digital processing to the signal, in particular in a terminal, on the basis of information produced by the operators and to produce the information addressed to the operators and being thus relieved of the processing operations carred out by the operators.

14 Claims, 3 Drawing Sheets

SIGNAL PROCESSING CIRCUIT FOR THE EUROPEAN DIGITAL CELLULAR RADIO SYSTEM

BACKGROUND OF THE INVENTION

The present invention concerns a digital signal processing circuit which finds an application in the European digital cellular radio system defined by the Groupe Speciale Mobile (hereinafter called the "GSM") of the European Telecommunications Standards Institute (ETSI).

The circuit is designed to carry out in particular the digital part of the signal processing needed in a mobile, portable or hand-portable terminal. In this context, "terminal" means the equipment providing access to the communication network. This application is not the only one as the circuit might be used in other elements of the cellular radio system.

The signal processing circuit must therefore provide all the functions described below, these functions being specified in the form of GSM recommendations. Given the number and the complexity of these functions the circuit must necessarily have a programmable structure. The solution commonly employed is to implement this circuit with a parallel architecture, that is to say to use multiple processors each of which carries out some of these functions, which solution is described in particular in the articles "Advanced VLSI components for digital cellular mobile radio"—Electrical Communication, volume 63, No 4, pages 409 through 414 by Ranier et al. and "Signal processing requirements in Pan-european digital mobile communications"—IEEE International symposium on circuits and systems, volume 2, 7 through 9 June 1988, pages 1803 through 1810. This solution offers some flexibility as the various functions are distributed. However, it requires interface units between the processors and a control unit to coordinate the operation of the processors. These units make a significant contribution to the overall size of the circuit. What is more, as the processors employed are relatively complex it is difficult to envisage the integration of the circuit into a single component using currently available technologies. As the circuit comprises multiple components it is bulky and this is an obstacle to miniaturization of the terminal into which it is incorporated. The circuit is also costly. Furthermore the software of the circuit includes, in addition to the various programs needed for executing its specific functions, programs which enable the units and processors of the circuit to cooperate. It is therefore large.

Another solution would be to employ a single processor for the circuit providing all the signal processing functions. A processor of this kind would have to be very powerful in terms of the number of instructions it could execute per unit time and could not be manufactured using currently available technologies.

In any event, even though the high speed of progress in microelectronics makes the availability of a processor of this type feasible in the shorter or longer term, it would be very costly. Also, the signal processing software would be complex because it would have to be of the multitasking type and a large amount of memory would be needed to store it.

SUMMARY OF THE INVENTION

An object of the present invention is a signal processing circuit for the cellular radio system defined by the GSM which offers reduced size, which is designed to be integrated in a single component and whose associated software also offers better performance in terms of memory size requirement. It follows that this circuit is economical in terms both of consumption and of cost.

The signal processing circuit for the European digital cellular radio system continuously exchanging speech samples with a converter circuit, exchanging baseband digital signals with a radio circuit and exchanging data and signalling information with a control circuit which also transmits control signals to it, comprises a control operator, a processor which controls an audio operator and a radio operator, the audio operator receiving and producing the speech samples and transmitting them to the processor and receiving them from the processor in the form of groups of samples, the radio operator receiving and producing the baseband digital signals and transmitting them to the processor and receiving them from the processor in the form of batches, the control operator routing and formatting the data, the signalling information and the processor control signals, the processor being adapted to apply digital processing to the signal, in particular in a terminal, on the basis of information produced by the operators and to produce the information addressed to said operators and being thus relieved of the processing operations carried out by the operators.

Moreover, in the signal processing circuit for the European digital cellular radio system, the audio operator comprises an audio transmit module which carries out the first part of speech encoding in addition to grouping speech samples.

Furthermore, in the signal processing circuit for the European digital cellular radio system, the audio operator comprises an audio receive module which carries out the last part of speech decoding in addition to transmitting speech samples based on groups of samples.

Additionally, in the signal processing circuit for the European digital cellular radio system the radio operator comprises a radio transmit module which modulates bursts provided in this case by the processor instead of batches in addition to transmitting digital signals in the baseband based on batches.

In the signal processing circuit for the European digital cellular radio system, the radio operator advantageously comprises a radio receive module which estimates the continuous component of the digital signals in the baseband in addition to forming these signals into batches.

According to a first additional feature of the signal processing circuit for the European digital cellular radio system, the radio receive module also corrects the d.c. component of the digital signals in the baseband.

According to a second additional feature of the signal processing circuit for the European digital cellular radio system, the radio receive module also measures the power of the digital signals in the baseband.

According to a third additional feature of the signal processing circuit for the European digital cellular radio system, the radio receive module also transposes the frequency of the digital signals in the baseband.

According to a fourth additional feature of the signal processing circuit for the European digital cellular radio system, the radio receive module also filters the digital signals in the baseband.

In one embodiment of the signal processing circuit for the European digital cellular radio system, the processor comprising a processing unit and a memory, the memory is accessed directly by at least one of the audio transmit, audio receive, radio transmit and radio receive modules.

There is likewise provision in the signal processing circuit for the European digital cellular radio system, the processor comprising a processing unit, for it to comprise at least one dedicated operator interfaced to this processing unit.

In an alternative embodiment of the signal processing circuit for the European digital cellular radio system, the processing unit is designed to operate using serial processing software.

In the signal processing circuit for the European digital cellular radio system, the control operator advantageously comprises an activation module designed to adapt the control signals issued by the control circuit and to produce the clock signals needed by the processor and by the audio transmit, audio receive, radio transmit and radio receive modules.

In a preferred embodiment of the signal processing circuit for the European digital cellular radio system the control operator comprises an interface module transferring data and signalling information without interpreting them.

BRIEF DESCRIPTION OF THE DRAWINGS

The invention will be better understood from a non-limiting example of implementation described with reference to the appended figures in which.

DETAILED DESCRIPTION OF THE PREFERRED EMBODIMENT

Figure 1:
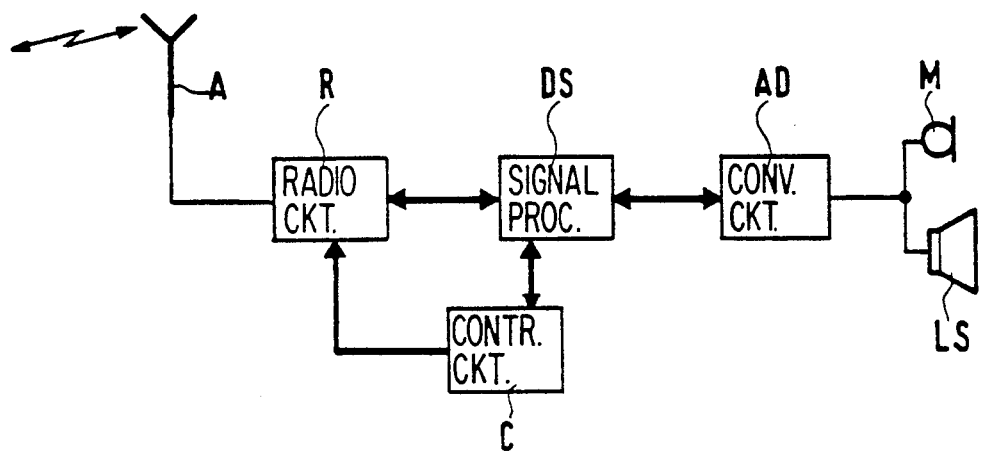
FIG. 1 shows a block diagram of a terminal.

The circuit in accordance with the invention will be described as part of the terminal shown in FIG. 1. This terminal exchanges information by means of a radio signal with a base station (not shown) which is a point of access to the communication network. It comprises an antenna A connected to a radio circuit R which converts a received radio signal into a digital signal in the baseband and carries out the converse operation on a transmitted signal. It comprises the signal processing circuit DS which carries out various operations on the baseband receive signal to produce a digital speech signal to be sent to a converter circuit AD or data to be sent to a control circuit C and which carries out the converse operation on the transmitted signals. The converter circuit AD provides the digital-to-analog and analog-to-digital converters to interface the signal processing circuit to the microphone M and the loudspeaker LS of the terminal.

The control circuit C directs the operation of the terminal, in particular by controlling the radio circuit and the signal processing circuit.

The various functions that the signal processing circuit must provide will now be described in detail in order to make it possible to define precisely the connections of this circuit to the other circuits of the terminal and the internal connections between these various units.

The GSM recommendations cited with their version numbers are the most recently published at this time and are therefore easily accessible. The topics covered in them will no doubt carried forward into future editions.

The GSM defines two types of communication channel connecting a terminal to a base station:

traffic channels which carry speech or data, known as TCH channels;

signal channels which condition the operation of the system.

The transmit functions which transmit information from the terminal to a base station will be described first.

Speech undergoes special processing that is not applied to data or to signalling channels.

Speech is in the form of samples 13 bits long at a frequency of 8 kHz supplied by the converter circuit AD which receives at its input the signal from the terminal's microphone.

The first stage in processing the signal is to apply to these samples Regular Pulse Excitation-Linear Predictive Coding using Long Term Prediction. This RPE-LPC-LTP coding is fully defined in GSM Recommendation 06.10 version 3.2.0. It produces a block of 260 bits from 160 samples every 20 ms.

The second stage is to detect speech activity. The energy contained in the speech samples in a block is measured and a speech activity signal is produced if this exceeds a threshold. This detection function is fully defined in GSM Recommendation 06.32 version 3.0.0.

The third stage is to carry out a comfort noise analysis. When the speech activity signal is absent the noise transmitted by the microphone is analyzed over four consecutive blocks to produce a single noise block with the same format of 260 bits. This stage is described in GSM Recommendation 06.12 version 3.0.0.

The fourth stage concerns discontinuous transmission as specified in GSM Recommendation 06.31 version 3.1.0. According to the state of the speech activity signal and a transmission indicator provided by the radio circuit of the terminal there are produced a transmit signal authorizing or barring the transmission of a block (speech or noise) and an end of speech signal signifying the presence or the absence of a block of noise.

The object of speech processing is therefore to produce blocks of bits which contribute to the definition of a traffic channel in the same manner as a set of data.

Channel processing is applied to the traffic channel (hereinafter referred to as the TCH channel) and the various signalling channels.

The transmit signalling channels described in GSM Recommendation 05.01 version 3.3.1 include:

the fast associated control channel FACCH, the slow associated control channel SACCH, the random access channel RACH, the stand-alone dedicated control channel SDCCH.

The FACCH channel has priority over all other channels including the TCH channel except the RACH channel. The GSM has provided a block stealing indicator showing when the FACH channel is substituted for the normal channel.

All these channels are subject to the channel processing described in GSM Recommendation 05.03 version 3.5.1 which comprises encoding and interleaving for a block of bits (which is a speech block or a noise block generated by the speech processing or a data block or a signalling information block).

For all channels except the RACH channel this encoding converts a block into an encoded block of 456 bits.

For the TCH channel conveying speech and for the FACH and SDCCH channels the encoded block is then interleaved a first time to form eight sub-blocks of 57 bits. The block stealing indicator associated with the block concerned is introduced into each sub-block and the first four sub-blocks of a particular encoded block are then interleaved with the last four sub-blocks of the previous encoded block to produce an interleaved block of 464 bits.

For the TCH channel carrying data and for the SACCH channel the encoded block is interleaved differently in a way which will not be described in more detail here as it is also described in GSM Recommendation 05.03.

The RACH channel is also encoded and interleaved to produce an interleaved block of 36 bits.

The various channels except the RACH channel are then enciphered in a manner that is partly described in GSM Recommendation 03.20 version 3.3.0, the encipherment algorithm being confidential. Interleaved blocks are subdivided into four parts of 116 bits each of which is enciphered to yield a 160-bit packet. As the RACH channel is not enciphered, for this channel a packet is an interleaved block.

The various packets are then processed to give them the format of the time division multiple access transmission system defined by the GSM. In this system the information is conveyed by frames of eight time slots each comprising 156.25 bits.

The packet processing specified in GSM Recommendations 05.01 version 3.3.1 and 05.02 version 3.4.1 produces a burst with the format of a time slot from a packet and from check bits. The normal burst of 148 bits obtained from a packet from the TCH, FACH, SACCH and SDCCH channels is distinguished from the 88-bit access burst obtained from a packet from the RACH channel.

A single time slot per frame is used for transmission. It always occupies the same position in successive frames.

The final transmit function is digital modulation of the bits forming the bursts. Minimal shift keying (MSK) modulation is employed. It is described in GSM Recommendation 05.04 version 3.1.1. It produces from the bits of a burst modulated transmit signals in the baseband at a frequency of 270.33 kHz denoted by convention the I and Q signals. Each pair of values of these digital signals I, Q each quantized on eight bits represents one bit of the burst. The modulation process inserts guard bits after the burst to form the 156.25 bits representing one time slot.

The baseband transmit signals are fed to the radio circuit R of the terminal.

The transmit functions having been described, the receive functions will now be described.

The radio circuit transmits to the signal processing circuit the two baseband receive signals I', Q' homologous to the baseband transmit signals I, Q.

The various receive channels include:
the broadcast channel BCCH,
the frequency control channel FCH,
the synchronization channel SCH,
the common control channel CCCH,
the fast associated control channel FACCH,
the slow associated control channel SACCH,
the stand-alone dedicated control channel SDCCH,
the traffic channel TCH.

The first receive function is synchronization, by which is meant the procedure enabling a terminal to connect to a base station.

The broadcast channel carries information necessary for synchronizing the terminal. In particular, it enables identification of the frequency control channels and the synchronization channel which are used to synchronize the terminal.

The terminal interprets the channel that it receives at the highest power level as the broadcast circuit transmitted by the base station to which it must connect. It therefore requires a power measuring function.

The power measuring function draws up a list of the channels received under the best conditions from a list of canvassed channels identified by their frequency. In this way it is possible to isolate the relevant broadcast channel and to characterize the broadcast channels transmitted by adjacent base stations which may be used by the terminal if it is in motion, for example.

When the relevant broadcast channel has been identified, synchronization involves detecting in succession the frequency control channel and the synchronization channel. This identifies the precise frequency of the various channels transmitted by the base station and the station's time reference, providing the basis for recognizing the time slots and the frames of the transmission system.

The next receive function is the demodulation function which can be carried out as soon as the terminal is synchronized. It concerns the BCCH, CCCH, FACCH, SACCH, SDCCH, SCH and TCH channels. It recovers a packet of 116 bits from the successive values of the baseband receive signals I', Q' during one time slot. It is the counterpart of the modulation carried out by the base station which is described in GSM Recommendation 05.04.

The next function is decipherment which reconstitutes an interleaved block of 116 bits from a packet. The decipherment algorithm is the counterpart of the encipherment algorithm and is only partially described in GSM Recommendation 03.20 because of its confidential nature.

After decipherment, receive channel processing recovers a block (speech, data or signalling) following de-interleaving and decoding of the interleaved blocks. De-interleaving is the counterpart of the interleaving described above in relation to transmit channel processing and will not be described in further detail. Also, decoding is the counterpart of the channel encoding described above. It can take various forms, the commonest of which is Viterbi decoding whose object is to recover the block which has the maximum probability of being the block to which the corresponding encoding was applied on transmission.

The blocks obtained in this way are routed towards the control circuit if they are data or signalling blocks, allowing for the block stealing indicator.

Speech blocks are the subject of receive speech processing comprising four functions.

The first function is discontinuous transmission processing defined in GSM Recommendation 06.31. This processing provides for controlling one of the subsequent functions on the basis of information provided by the control circuit specifying if a block is a speech block and if it has been received correctly or not.

The second function is the speech decoding function defined in GSM Recommendation 06.10. From a speech block of 260 bits it regenerates 160 samples on 13 bits at 8 kHz to be fed to the converter circuit.

The third function is the comfort noise insertion function defined in GSM Recommendation 06.12. This occurs if there is no speech activity during the transmit period of the corresponding TCH channel. It regenerates a comfort noise level from information contained in the received noise block. It also comprises a channel decoding operation which differs slightly from that applied to a speech block. It produces a series of 160 samples on 13 bits at 8 kHz to be fed to the converter circuit.

The fourth function is the speech extrapolation function described in GSM Recommendation 06.11 version 3.0.0. It is carried out if a block has been received incorrectly. It involves either reproducing the preceding block or producing a signal whose level falls progressively to zero to be fed to the converter circuit.

Figure 2:
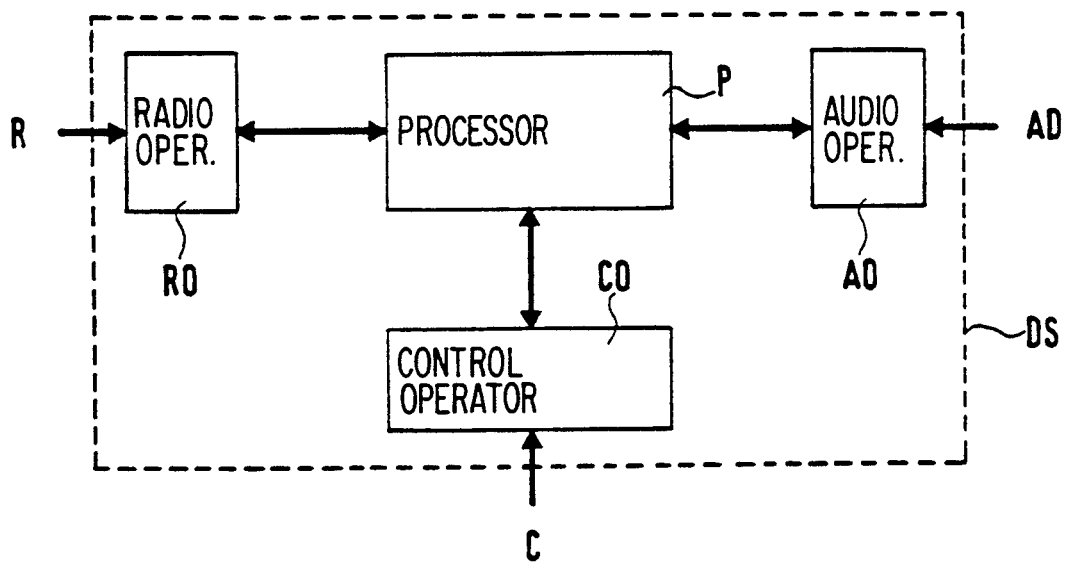
FIG. 2 shows a block diagram of the signal processing circuit in accordance with the invention.

The main functions of the signal processing circuit DS having been described, this circuit will now be described with reference to FIG. 2.

It comprises a processor P connected to an audio operator AO, a radio operator RO and a control operator CO.

The audio operator AO receives from the converter circuit AD and sends to this circuit speech samples to the standard defined in GSM Recommendation 06.10.

The radio operator RO sends to the radio circuit and receives from this circuit the baseband digital signals.

The control operator CO receives from the control circuit C and sends to this circuit signalling information conveyed by the signalling channels and data conveyed by the traffic channel. It can also carry signal processing circuit control signals.

The various units of the signal processing circuit will now be described in detail with reference to FIG. 3. Each of these units has been subdivided into a number of elements. This subdivision represents one mode of implementing the circuit and has the advantage of simplifying the description. It is not the only possible subdivision and must not be seen as limiting the invention in any way.

The audio operator AO comprises an audio transmit module 1 and an audio receive module 2.

The audio transmit module 1 receives speech samples on 13 bits at 8 kHz which the converter circuit produces from the microphone output signal. It formats these samples so that they are compatible with the processor and stores them temporarily so that the processor can acquire the formatted samples in groups of 160. This simplifies the speech processing software and minimizes the number of interrupts (one interrupt every 20 ms as compared with one interrupt every 0.125 ms in the case of continuous processing of samples).

According to a further but not indispensable feature of the invention, the audio transmit module 1 is also adapted to carry out the first part of the speech encoding known as "speech preprocessing" defined in GSM Recommendation 06.10.

This part of the encoding process eliminates the offset voltage and applies pre-emphasis filtering.

The audio receive module 2 receives from the processor groups of 160 samples at the rate of one group every 20 ms. It stores the samples temporarily and formats them so that they are compatible with the converter circuit. It supplies the formatted samples on 13 bits at 8 kHz successively to the converter circuit which is responsible for converting them into a signal for driving the terminal loudspeaker. This module has the same advantages as the previous module is respect of the frequency of processor interrupts.

According to a further but not indispensable feature of the invention, the audio receive module is also adapted to carry out the last part of the speech decoding known as "speech post-processing" also defined in GSM Recommendation 06.10. This part of the decoding process applies de-emphasis filtering.

The radio operator RO comprises a radio transmit module 3 and a radio receive module 4.

The radio transmit module 3 is advantageously adapted to carry out the modulation function. It receives from the processor and stores temporarily the bursts previously defined to produce the baseband transmit signals I, Q possibly formatted for processing by the radio circuit R. The modulation is applied "on the fly" to the bits of the burst, by which is meant that they are transmitted without further delay as soon as they are modulated. This means that a smaller memory can be used than in the contrary case in which it would be necessary to store the baseband signals I, Q before they are transferred to the radio circuit R. Because the modulation function is handled by this module, the processor is relieved of this task. It also receives less frequent interrupts than if it had to supply the baseband signals to the radio circuit itself.

According to an additional but not indispensable feature of the invention, the baseband transmit signals I, Q are oversampled 8 or 16 times, for example, in this module, which operation is familiar to the man skilled in the art.

The radio receive module 4 receives from the radio circuit R the baseband receive signals I', Q' each at a frequency around 270 kHz. It formats these signals and temporarily stores their successive values so that the processor can acquire them in batches for processing. The number of elements in a batch is fixed by the processor and depends in particular on the type of receive channel given that the receive processing depends on the channel. The processor therefore acquires a batch and not a succession of values, which offers the advantages already explained.

The radio receive module 4 may optionally be assigned certain supplementary operations described below.

A first operation is to estimate the d.c. component introduced by the radio circuit R into the baseband signals I', Q'. The estimate is arrived at by taking the average of a series of values of each signal. These averages are then stored for transmission to the processor P. Alternatively, the sum of these values is stored rather than their average, the processor knowing the number of values in a series and calculating the average for itself.

A second operation is to correct the d.c. component present in the baseband signal. A correction value supplied by the processor for each of the two signals I', Q' is added to the signals before they are stored. The correction values are advantageously established by the processor from the averages acquired during the first operation.

A third operation is to calculate the power of the baseband signals I', Q' after correction of the d.c. component. Given the modulation process employed, the instantaneous power of these signals is proportional to the sum of the squares of the values take by each of the signals at a given time. This instantaneous power is stored for transmission to the processor or, in an advantageous solution, the sum of the instantaneous powers for a series of values is stored.

A fourth operation is to transpose the frequency of the baseband signal. This operation is needed in the demodulation process because of the MSK modulation employed. After correction of the d.c. component each pair of values of the baseband signals, which can be regarded as a complex number, is subjected to a negative phase-shift of $\pi/2$ multiplied by its order of occurrence starting from an origin time. This purely arbitrary origin time can be that at which the first pair of values is stored; what is essentially important is that it is the same for each pair. The pairs of values after frequency transposition are stored for transmission to the processor.

A fifth operation is to apply filtering which can be used in the terminal synchronization phase in particular. The pairs of values after frequency transposition are added in series to produce a pair of filtered values, the number of pairs of a series being supplied by the processor. The pairs of filtered values are stored for transmission to the processor.

The data stored during the various operations described above is acquired by the processor in batches, at its own initiative, and not as the data is produced.

Various modes of operation of the radio receive module will now be described by way of example.

A first mode of operation applies during the synchronization phase when the receive channel is a broadcast channel. The d.c. component must be estimated and corrected and the power must be measured. The processor supplies the number of pairs of values of the baseband signals to be processed, for example 144. It also provides the number n1 of values over which the d.c. component is estimated (n'1=16, for example), the number n2 of pairs of values over which the power is measured (n2=16, for example) and the correction values for the two baseband signals. Following processing, n'1 estimates of the d.c. component are stored for each of these signals (in this example n'1=9) together with n'2 power values (n'2=9).

A second mode of operation applies when the receive channel is a frequency control channel. The d.c. component must be corrected, the power must be measured and the frequency transposition and filtering must be done. The processor supplies the number of pairs of values of the baseband signals to be processed, for example 1 408. It also supplies the number n2 of pairs of values over which the power is measured (n2=64, for example), the number n3 of pairs of values to which the filtering is applied (n3=16, for example) and the correction values of the two baseband signals. After processing, n'2 power values are stored (in this example n'2=22) together with n'3 pairs of filtered values (n'3=88).

A third mode of operation applies in particular when the receive channel is a traffic channel. The d.c. component must be corrected, the power must be measured and the frequency transposition must be done. The processor supplies the number of pairs of values of the baseband signals to be processed, for example 156. It also provides the number n2 of pairs of values over which the power is measured (n2=39, for example) and the correction values for the two baseband signals. After processing, 156 pairs of transposed values are stored together with n'2 power values (in this example n'2=4).

This completes the description of the radio operator.

The control operator CO comprises an interface module 5 and an activation module 6.

The interface module 5 is a basic transfer interface between the processor P and the control circuit C. It transfers and formats data between these two circuits without interpreting them in any way. The data is interpreted either by the control circuit or by the processor, depending on the direction of transfer. The data transmitted by this module comprises signalling information, data associated with a traffic channel or processor configuration signals in a particular operating mode.

The activation module 6 adapts the control signals (activation, reset, for example) from the control circuit C to render them understandable by the processor P. It is also in this module that are produced the clocks needed by the various modules, based on a timing signal produced by the control circuit. These clocks include the master clock of the processor and the data transfer clock which is related to the transfer frequency of the converter circuit.

To give numerical examples, the timing signal has a frequency of 26 MHz and the activation module produces a 78 MHz processor master clock, representing a computing power of 39 million instructions per second, together with the 104 kHz data transfer clock (speech samples on 13 bits supplied bit by bit at 8 kHz).

The processor P comprises a processing unit 7 and an associated memory 8. The processing unit may optionally be interfaced to at least one dedicated operator 9. In this known technique, the dedicated operator relieves the processing unit of some of the processing to be done for a given task, enabling the processor to carry out this task faster overall.

Figure 3:
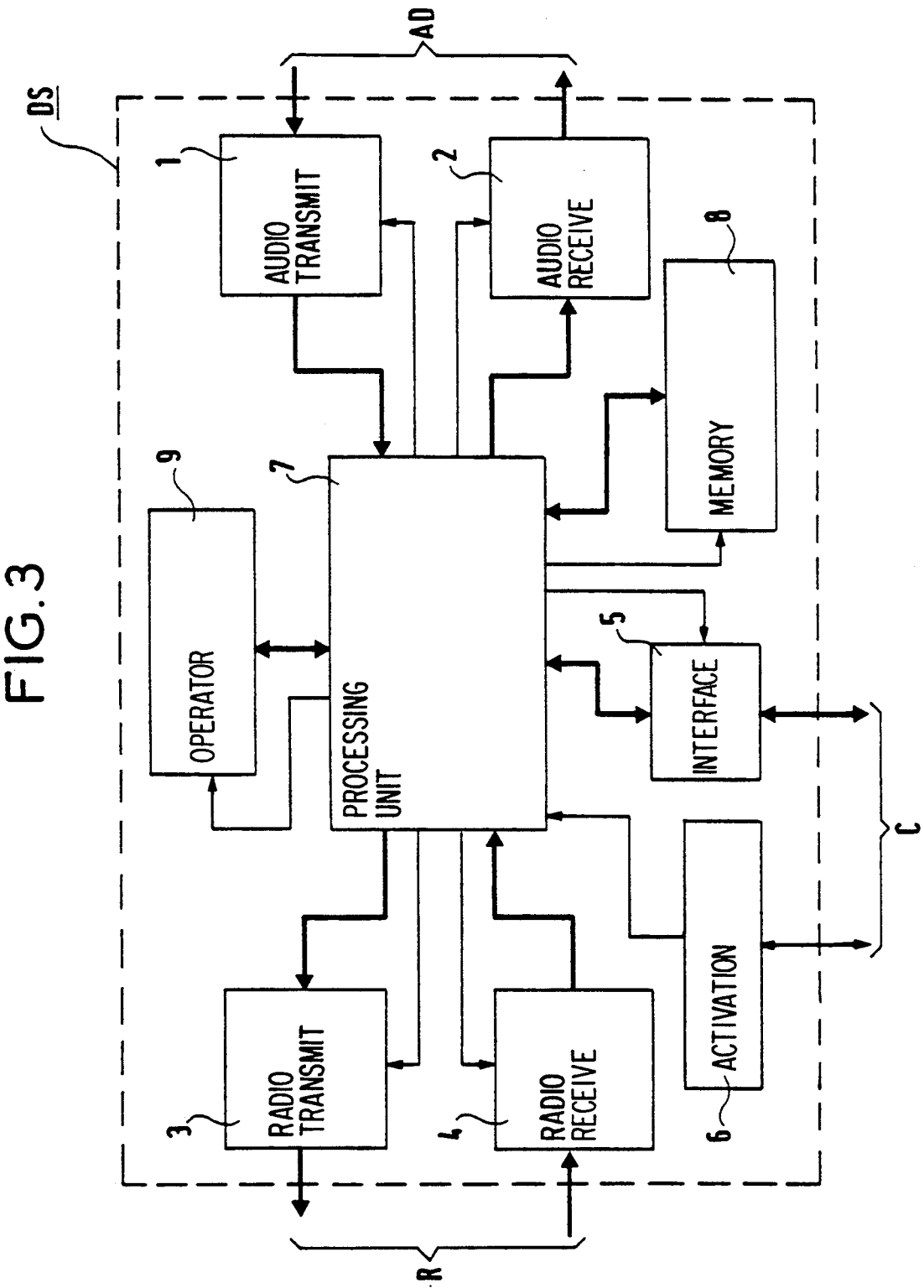
FIG. 3 shows a more detailed diagram of this circuit in which the various control signals are shown in thicker line and the data in thinner line.

In a first embodiment of the signal processing circuit the audio transmit module 1, audio receive module 2, radio transmit module 3 and radio receive module 4 each have a buffer memory for exchanging information with the processor, as shown in FIG. 3.

Figure 4:
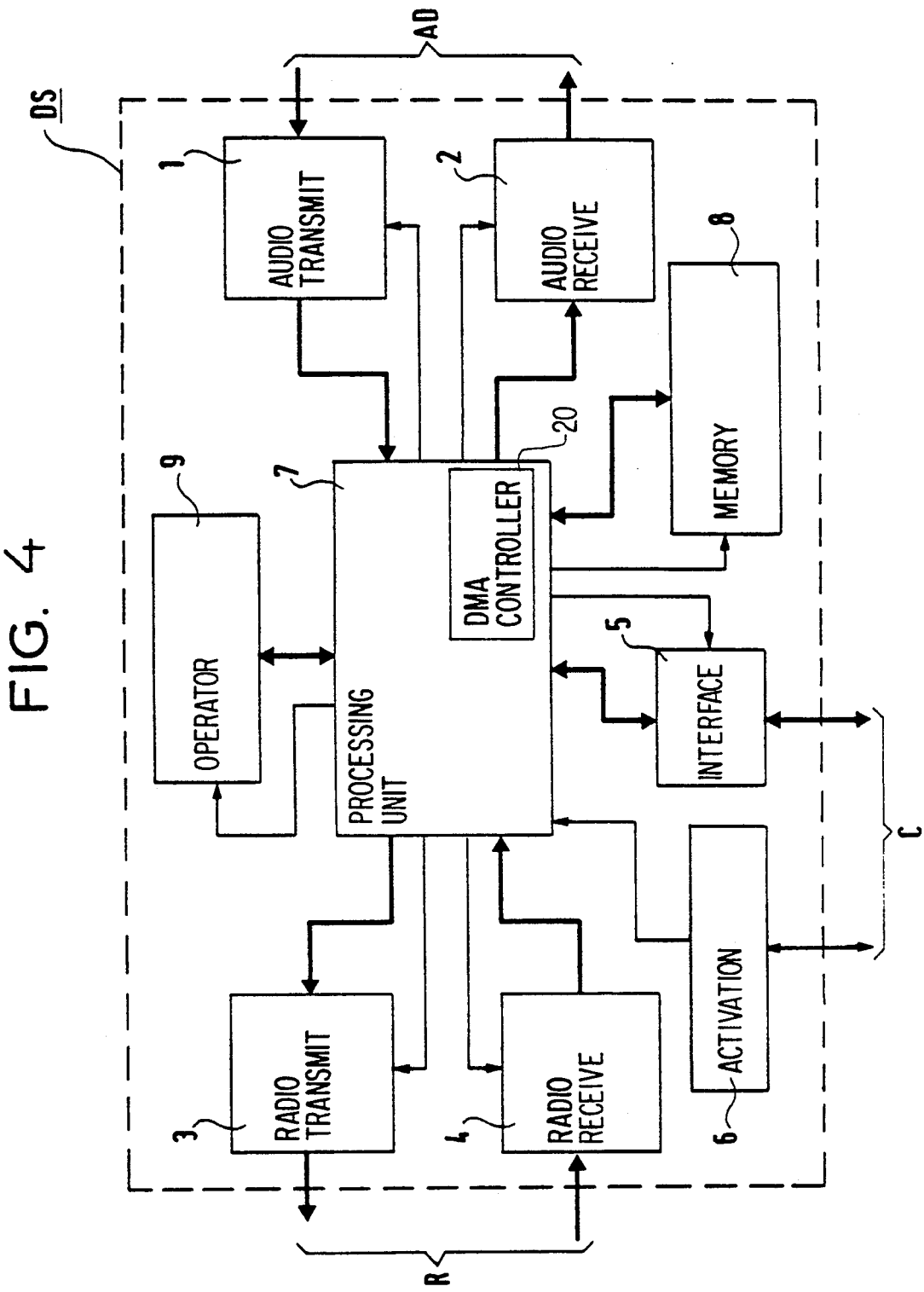
FIG. 4 is a diagram similar to FIG. 3 but of a second embodiment of the invention.

In a second embodiment shown in FIG. 4, the memory 8 centralizes all of the information produced or received by the various modules of the signal processing circuit. The advantage of this direct memory access (DMA) arrangement as compared with a decentralized solution in which multiple memories are associated with the various modules is that it enables the memory size to be reduced. The decentralized solution requires intermediate storage areas. Moreover, for a given quantity of information to be stored, a single memory takes up less space than multiple memories. On the other hand, it is necessary to provide a controller 20 which organizes access to the memory by the various modules. This controller takes up some room in the circuit and imposes numerous additional interrupts on the processor.

The processing unit 7 is a generalized signalling processor, i.e. it is not dedicated to any particular application. It carries out all the digital signal processing functions of the GSM system except for those which are implemented by the other modules of the signal processing circuit DS and which have already been described.

The processing unit 7 could operate with two types of software, parallel processing software or serial processing software. As its name indicates, parallel processing software carries out various processes in parallel according to an established order of priority. It requires additional memory space for storing intermediate data produced during processing. It is also more complex as it must incorporate the program for scheduling the various processing operations. The serial processing software carries out the various processing operations in succession without interrupting them. It is simpler and therefore smaller than the parallel processing software. However, it requires more power of the processing unit in terms of the number of instructions that can be executed per unit time. Provision is therefore made for the addition of at least one dedicated operator to the processing unit. The more powerful this processing unit the more costly it is.

For example, the dedicated operator 9 handles some of the signal processing functions that are relatively time-consuming. This applies to the speech encoding, channel decoding and demodulation functions, for example.

The signal processing circuit DS having been described, its operation will now be described broken down into a number of phases.

In the first phase the control circuit C activates the signal processing circuit, i.e. it informs the processor P that it is about to send it information, by means of the activation module 6.

In the second phase the control circuit C configures the processor P in a particular operating mode specifying the various processing operations to be carried out, by means of the interface module 5.

In the third phase the processor interprets the information supplied by the control circuit and sets accordingly the audio transmit module 1, the audio receive module 2, the radio transmit module 3 and the radio receive module 4 to their respective operating modes essentially selected from one or more working modes and one or more test modes. As previously explained the radio receive module 4 has various working modes.

In the final phase the various units operate in the sequence defined by the GSM, in particular in the 5 and 6 series recommendations.

Sequencing can be broken down into a general sequence and a mode sequence. The general sequence is at the initiative of the control circuit C which, during the second phase, sets up the control circuit C in a mode defining a set of processing operations to be carried out.

The mode sequencing defining the stringing of processing operations in a particular mode is at the initiative of the processor P.

We claim:

1. Signal processing circuit for a digital cellular radio system, said signal processing circuit continuously exchanging speech samples with a converter circuit (AD), exchanging baseband digital signals with a radio circuit (R) and exchanging data and signalling information with a control circuit (C) which also transmits processor control signals to it, characterized in that said signal processing circuit comprises a control operator (CO), a processor (P) which controls an audio operator (AO) and a radio operator (RO), said audio operator (AO) receiving said speech samples and transmitting them to said processor and receiving them from said processor in groups of samples, said radio operator (RO) receiving said baseband digital signals and transmitting them to said processor and receiving them from said processor in batches, said control operator (CO) routing and formatting said data, said signalling information and said processor control signals, said processor (P) being adapted to perform digital processing associated with said speech samples, in particular in a terminal, in accordance with information produced by said operators and to provide information addressed to said operators and being thus relieved of processing operations carrier out by said operators.

2. Signal processing circuit according to claim 1 characterized in that said audio operator (AO) comprises an audio transmit module (1) which carries out a first part of speech encoding in addition to grouping speech samples.

3. Signal processing circuit according to claim 1 characterized in that said audio operator (AO) comprises an audio receives module (2) which carries out a last part of speech decoding in addition to transmitting speech samples based on groups of samples.

4. Signal processing circuit according to claim 1 characterized in that said radio operator (RO) comprises a radio transmit module (3) which modulates bursts, provided in this case by said processor (P) instead of batches, in addition to transmitting digital signals in the baseband based on batches.

5. Signal processing circuit according to claim 1 characterized in that said radio operator (RO) comprises a radio receive module (4) which estimates a d.c. component of the digital signals in the baseband in addition to forming said digital signals into batches.

6. Signal processing circuit according to claim 5 characterized in that said radio receive module (4) also corrects the d.c. component of said digital signals in the baseband.

7. Signal processing circuit according to claim 5 characterized in that said radio receive module (4) measures the power of said digital signals in the baseband.

8. Signal processing circuit according to claim 6 characterized in that said radio receive module (4) also transposes the frequency of said digital signals in the baseband.

9. Signal processing circuit according to claim 8 characterized in that said radio receive module (4) also filters said digital signals in the baseband.

10. Signal processing circuit according to claim 1 characterized in that said processor (P) comprises a processing unit (7) and a memory (8), said memory being accessed directly by at least one of the audio transmit (1), audio receive (2), radio transmit (3) and radio receive (4) modules.

11. Signal processing circuit according to claim 1 characterized in that said processor (P) comprises a processing unit (7) and further comprises at least one dedicated operator interfaced to said processing unit.

12. Signal processing circuit according to claim 10 characterized in that said processing unit (7) is designed to operate using serial processing software.

13. Signal processing circuit according to claim 1 characterized in that said control operator (CO) advantageously comprises an activation module (6) designated to adapt said control signals issued by said control circuit (C) and to produce clock signals needed by said processor (P) and by said audio transmit (1), audio receive (2), radio transmit (3) and radio receive (4) modules.

14. Signal processing circuit according to claim 1 characterized in that said control operator (CO) comprises an interface module (5) transferring said data and said signalling information without interpreting them.

* * * * *